United States Patent [19]

Suzuki

[11] Patent Number: 5,646,506
[45] Date of Patent: Jul. 8, 1997

[54] METHOD OF CHARGING A SECONDARY BATTERY AND AN APPARATUS THEREFOR

[76] Inventor: Takeshi Suzuki, No. 10-26, Nakamachi 1-chome, Koganei-shi, Tokyo, Japan

[21] Appl. No.: 700,865

[22] Filed: Aug. 21, 1996

[51] Int. Cl.$^6$ .............................. H01M 10/44; H02J 7/00
[52] U.S. Cl. .................. 320/21; 320/20; 320/39; 320/40
[58] Field of Search .................. 320/21, 39, 40, 320/30-32

[56] References Cited

U.S. PATENT DOCUMENTS

| | | | |
|---|---|---|---|
| 3,944,904 | 3/1976 | Hase | 320/21 X |
| 4,146,830 | 3/1979 | Foster | 320/39 X |
| 4,213,081 | 7/1980 | Taylor | 320/20 X |
| 5,172,044 | 12/1992 | Sasaki et al. | 320/22 |
| 5,352,967 | 10/1994 | Nutz et al. | 320/20 |
| 5,408,170 | 4/1995 | Umetsu et al. | 320/22 X |

*Primary Examiner*—Peter S. Wong
*Assistant Examiner*—K. Shin
*Attorney, Agent, or Firm*—Pearne, Gordon, McCoy & Granger LLP

[57] ABSTRACT

A method of charging a secondary battery by applying the voltage pulses higher than a rated terminal voltage of the secondary battery at predetermined intervals so that a charging current intermittently flows through the secondary battery while the peak value or pulse width of the charging current is controlled as the voltage measured across the terminals of the secondary battery at the intervals when the the voltage pulses are not applied steppedly is made higher.

4 Claims, 6 Drawing Sheets

METHOD OF CHARGING A SECONDARY BATTERY AND AN APPARATUS THEREFOR

BACKGROUND OF THE INVENTION

This invention relates to a method of charging a secondary battery and a charging apparatus for using such a method.

A secondary battery has been used for various portable electronic instruments such as a cellular phone, a note type personal computer, a video camera and so on. Of late, the secondary battery is also spotlighted as a power supply for a vehicle such as a bicycle or a car.

There have been used various types of a secondary battery such as a lead-acid storage battery used most anciently and a nickel-cadmium (Ni-Cd) battery, a nickel-hydrogen (Ni-MH) battery, a lithium-ion (Li-Ion) battery which are developed lately and so on. A Ni-Cd battery or a Ni-MH battery among the aforementioned secondary batteries have had an overwhelming market share for the portable electronic instruments because they can be compacted and can replace the conventional manganese dry battery.

However, the conventional secondary batteries disadvantageously have a charging time of 2 through 5 hours normally required as they are charged by the conventional charging method recommended by the battery maker. There has been provided by a maker other than the battery maker a so-called quick charger which is able to charge the secondary battery for a charging time of about 30 minutes to one hour with a higher charging current. Such a quick charger causes the secondary battery to have a higher temperature at the end of charging and to have a shorter battery life due to its higher charging current. In addition thereto, a gas generates within the battery so as to make the inner pressure higher, if any, which disadvantageously causes the explosion of the battery to be made.

Furthermore, as the secondary battery repeats the incomplete charge and discharge, there happens a so-called memory effect of the secondary battery which causes the effective service capacity to gradually decrease. This disadvantageously causes the secondary battery to be unable to be used earlier. The memory effect of the secondary battery is caused by making a so-called addition charge which is made by charging the battery before the capacity of the secondary battery is completely consumed or discharged. In order to decrease the memory effect of the secondary battery, it should be completely discharged before it is charged. However, this causes the charge of the secondary battery to take a substantially longer time and the operation to be made troublesome. For example, in case that the cellular phone should be charged before going outdoors, the addition charge will be inevitably made because there has no enough time.

The memory effect of the secondary battery is caused by a chemical material being crystallized due to its electro-chemical change. The once generated crystal can be effectively broken by activating the chemical material while a higher electric field is applied thereto or a higher voltage is applied thereto so that a larger charging current flows. To this end, there has been proposed a method of preventing the memory effect of the secondary battery by a large charging current or an impulse pulse current flowing through the secondary battery whereby the memory effect is prevented. However, as aforementioned, as the charging current is made larger, the battery will be fatally damaged due Lo a higher temperature in the interior of the battery and a gas generation.

SUMMARY OF THE INVENTION

Accordingly, it is a principal object of the invention to provide a method and/or an apparatus for being able to quickly charge a secondary battery without any damage thereof.

It is another object of the invention to provide a method and/or an apparatus for charging a secondary battery without any generation of a memory effect although it is repeatedly charged and discharged.

A method of charging a secondary battery suitably accomplishing the aforementioned object of the invention is characterized by comprising the steps of;

intermittently passing a charging current through said secondary battery by applying voltage pulses higher than a rated terminal voltage at predetermined intervals;

measuring a terminal voltage of said secondary battery while said voltage pulses are not applied and measuring said charging current while said voltage pulses are applied;

steppedly setting a plurality of terminal voltages different from each other within a range of variation in said terminal voltage from a course of charging to an end of charging;

controlling said charging current pulses so that at least one of a peak value and a pulse width of said charging current varies everytime the measured terminal voltage of said secondary battery reaches the set terminal voltage at each stage whereby said secondary battery is charged until said terminal voltage reaches the set terminal voltage at the final stage.

In the charging method of the invention, the charging current pulses may be preferably so controlled that they have the same peak value kept and the pulse width smaller than ever as the measured terminal voltage of the secondary battery reaches the set terminal voltage at each stage, then they have the peak value smaller than ever and the pulse width larger than ever, and repeat the control of the aforementioned two steps. Thus, the secondary battery can be charged while the effective charging current may be steppedly smaller.

In the charging method of the invention, the pulse width should be preferably made larger so that it never exceeds the maximum value of the preceding pulse widths and it should be preferably made smaller so that it is identical to the minimum value of the preceding pulse width.

An apparatus for charging a secondary battery suitably carrying out the method of the invention is characterized by comprising;

a DC power supply;

a power control to control at least one of a peak value and a pulse width of charging current pulses being supplied from said DC power supply to said secondary battery;

a measurement part to measure a charging current and a terminal voltage of said secondary battery;

and an operation part to provide an instruction on said peak value and said pulse width of said charging current pulses to said power control based on a measurement result from said measurement part;

said operation part having a plurality of set, voltages different from each other within a range of variation in said terminal voltage from a course of charging to an end of charging and receiving said terminal voltage of said secondary battery when a voltage is not applied across said secondary battery and said charging current when said voltage is applied to provide said instruction of varying at least one of said peak value and said pulse width of said charging current everytime the input terminal voltage of said secondary battery reaches the set terminal voltage at each stage and said power control controlling said charging control based on said instruction from said operation part.

BREIF DESCRIPTION OF THE DRAWINGS

The above and other objects and features of the invention will be apparent from the description of the embodiments of the invention taken along the accompanying drawings in which.

Figure 6:
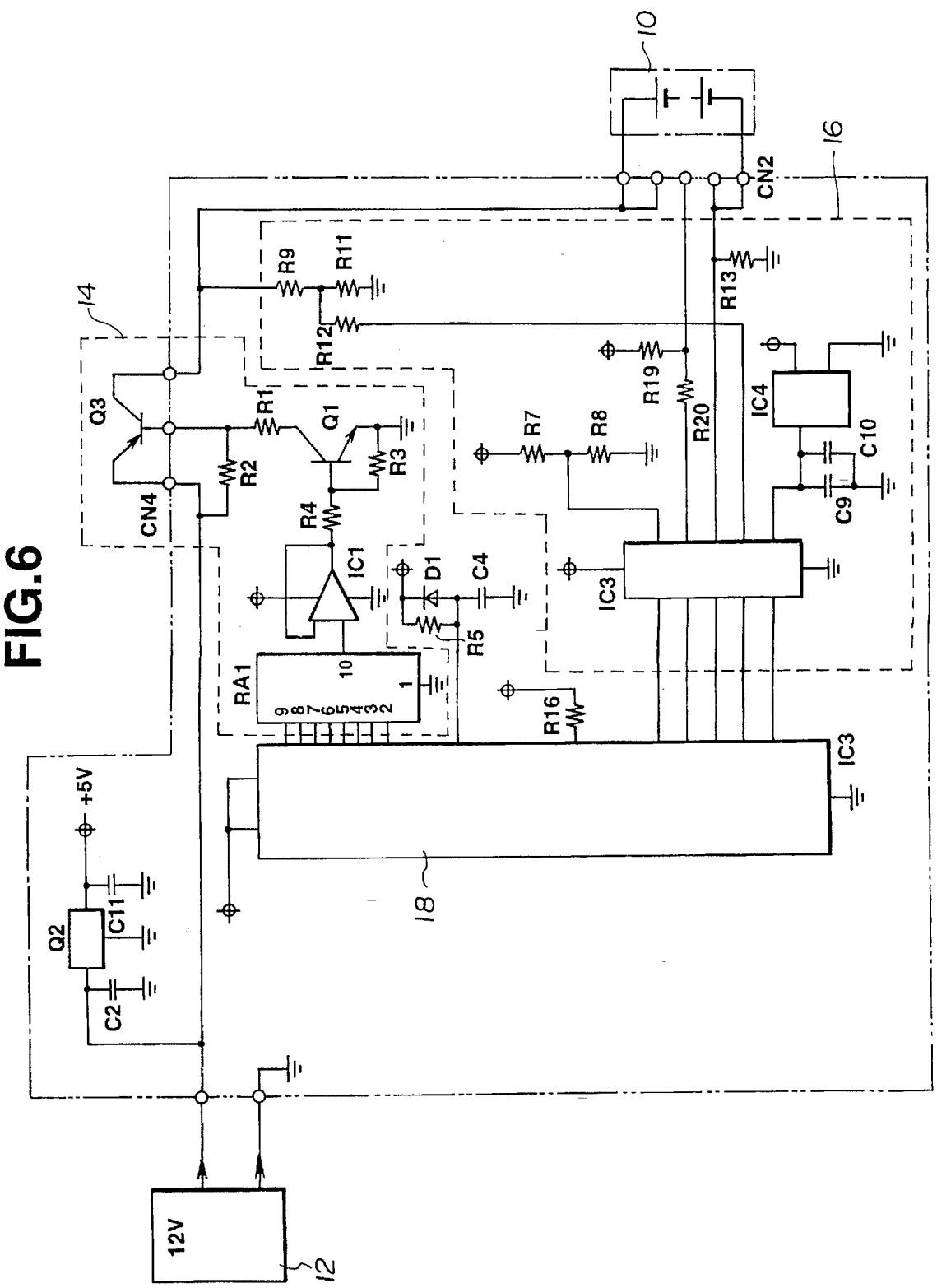

and FIG. 6 illustrates a circuit of the apparatus for charging the secondary battery constructed in accordance with an embodiment of the invention.

DETAILED DESCRIPTION OF THE EMBODIMENTS OF THE INVENTION

Figure 1:
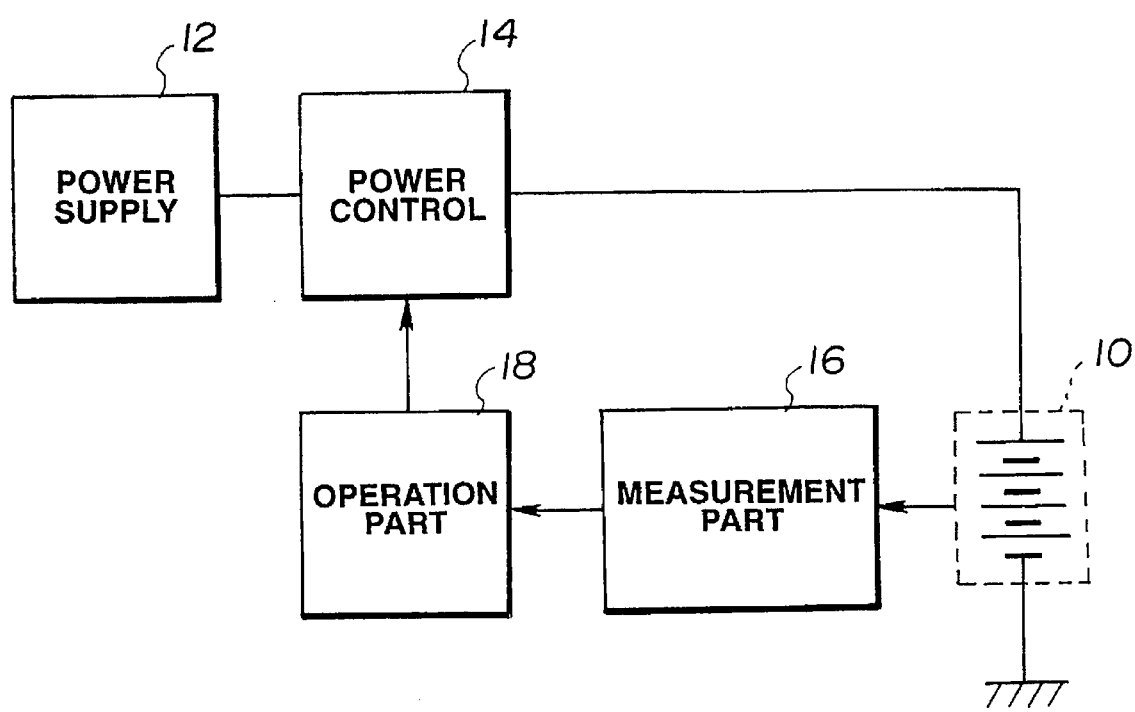
FIG. 1 is a block diagram of an apparatus for charging a secondary battery constructed in accordance with one mode of the invention.

An outline of an apparatus for charging a secondary battery constructed in accordance with one mode of the invention will be described with reference to FIG. 1. The apparatus of the invention comprises a DC power supply 12 to provide an electric power to a secondary battery 10 to be charged, a power control 14 to control a charging current flowing through the secondary battery 10 by controlling a voltage applied across the secondary battery 10, a measurement part 16 to measure the charging current and a terminal voltage of the secondary battery 10 and an operation part 18 to determine the charging current to flow through the secondary battery 10 based on a measurement result from the measurement part and to provide an instruction to the power control 14 so that the determined charging current flows through the secondary battery 10, The power control 14 serves to intermittently pass the charging current by intermittently applying the voltage in the form of pulses higher than the rated terminal voltage of the secondary battery 10. The measurement part 16 measures the terminal voltage of the secondary battery 10 while the voltage pulses are not applied between the adjacent voltage pulses and measures the charging cuurent while the voltage pulses are applied.

The operation part 18 has a plural of stages of voltages set within a range of variation in the rated terminal voltage from a course of charging to an end of charging and has a peak value and a pulse width of the charging current set in a predetermined manner until the terminal voltage of the secondary battery reaches each stage of set value.

The operation part 18 serves to compare the terminal voltage of the secondary battery 10 measured by the measurement part 16 with the set voltage of the corresponding stage to provide to the power control 14 the instruction on making the peak value or the pulse width of the charging current pulses smaller everytime the terminal voltage of the secondary battery reaches the set voltage at each stage. The power control 14 controls the voltage applied across the secondary battery 10 based on the instruction from the operation part 18 so that the charging current is controlled.

Figure 2:
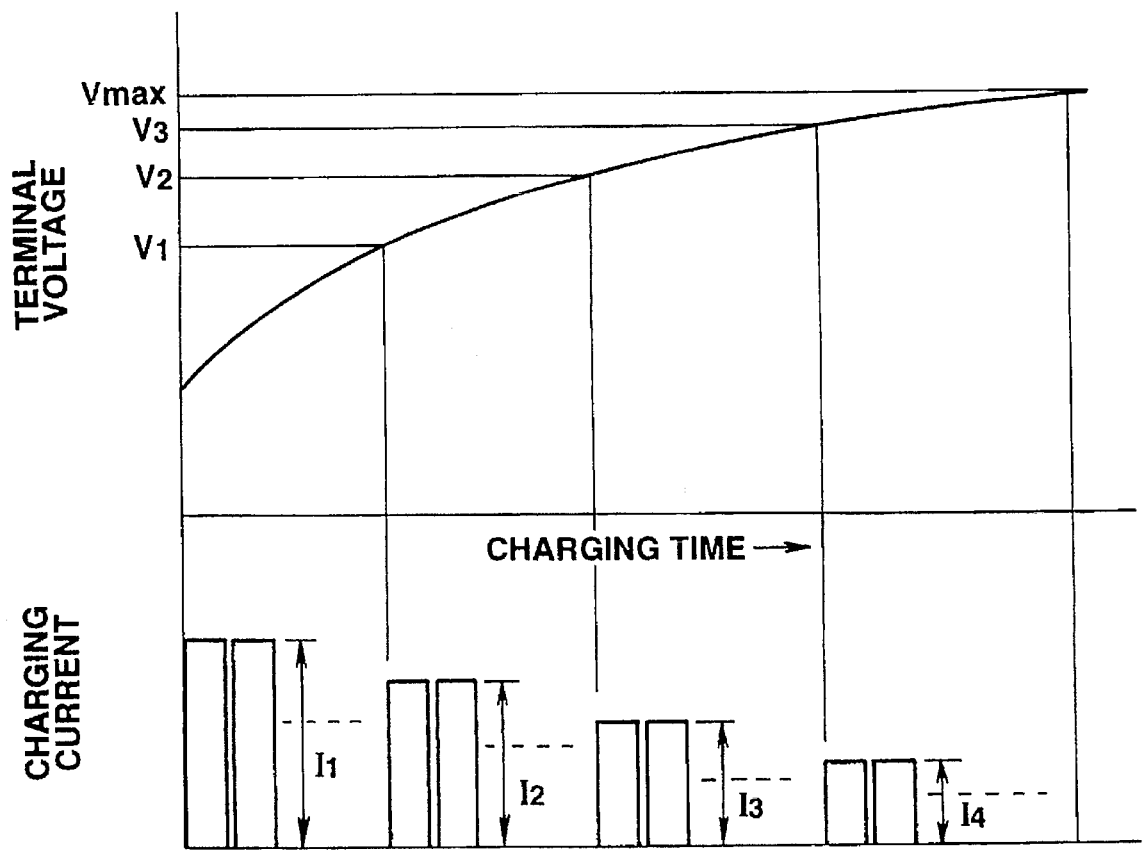
FIG. 2 is a graph illustrating a method of charging a secondary battery in accordance with one mode of the invention.

An example of the method of charging the secondary battery 10 by the apparatus of the invention is illustrated in FIG. 2. In FIG. 2, $V_1$, $V_2$, $V_3$ and $V_{max}$ indicate the set voltages of the operation part 18, respectively. At the beginning of charging, the operation part 18 instructs the power control 14 to intermittently pass through the secondary battery 10 the charging current pulses of the peak value $I_1$ relatively larger so as to enable the secondary battery 10 to be quickly charged. In this example, the pulse width of the charging current pulses is shown to be uniform. The power control 14 controls the voltage applied across the secondary battery 10 so that the charging current pulses of the peak value $I_1$ flow through the secondary battery This charging causes the secondary battery 10 to make the terminal voltage gradually higher. The terminal voltage of the secondary battery 10 is measured in between the adajcent pulses. As the terminal voltage of the secondary battery 10 reaches the first set value $V_1$ of the terminal voltage, the operation part 16 instructs the power control 14 to pass through the secondary battery 10 the charging current $I_2$ of the peak value lower a degree than ever. Thus, the power control 14 controls the voltage to be applied across the secondary battery 10 so that the charging current $I_2$ flows through the secondary battery 10. Similarly, as the terminal voltage of the secondary battery 10 reaches the set value $V_3$, the charging current $I_3$ of the peak value lower than ever flows through the secondary battery 10 and as it reaches the set value $V_4$, the charging current $I_4$ flows.

In this manner, the charging is made by making the peak value of the charging current pulses steppedly lower until the charging current is finished when the terminal voltage of the secondary battery 10 reaches the set value $V_{max}$ of the final stage. This enables the secondary battery 10 to be charged for a shorter time while it is prevented from being heated and also the memory effect of the secondary battery to be prevented from happening.

A particular embodiment of the method of the invention will be described with reference to FIG. 3.

The secondary battery provided for this test was a Ni-Cd battery of 4 cells having a nominal rated terminal voltage of 6 V and manufactured by and commercially available from Motorola Inc., U.S.A. The battery was charged after it was discharged until the terminal voltage thereof became 4.6 V (1.16 V per cell).

The charging started with the initial charging current of the peak value of 2.5 A and of the pulse width of 30 ms. The distance between the adjacent pulses was 1 ms and the terminal voltage of the secondary battery was meausured in between the adjacent pulses. As the terminal voltage reached the set value $V_1$ of 6.5 V, the pulse width of the charging current pulses was made 5 ms while the peak value of 2.5 A remained kept. As the terminal voltage of the secondary battery reached the set value $V_2$ of 7.0 V, the peak value of the charging current pulses was made 1.8 A and the pulse width thereof was made 20 ms. As the terminal voltage of the secondary battery reached $V_3$ of 7.2 V, the pulse width of the charging current pulses was made 5 ms while the peak value of 1.8 A remained kept. As the terminal voltage of the secondary battery reached $V_4$ of 7.4 V, the peak value of the charging current pulses was made 1.0 A and the pulse width thereof was made 20 ms. As the terminal voltage of the secondary battery reached 7.5 V, the pulse width of the charging current pulses was made 5 ms while the peak value of 1.0 A remained kept. Finally, when the terminal voltage of the secondary battery reached $V_{max}$ of 7.55 V, the charging current was made zero so that the charging was finished.

As a result that the secondary battery was charged by the aforementioned method of the invention, the charging could be accomplished for 20 minutes while it took two hours for the secondary battery to be charged by the conventional method (delta-V system).

The charging time when the secondary battery was charged by the method of the invention after it was discharged by 70% was only 15 minutes while the charging time when the same secondary battery was charged by the conventional method was one hour and 20 minutes.

Figure 4:
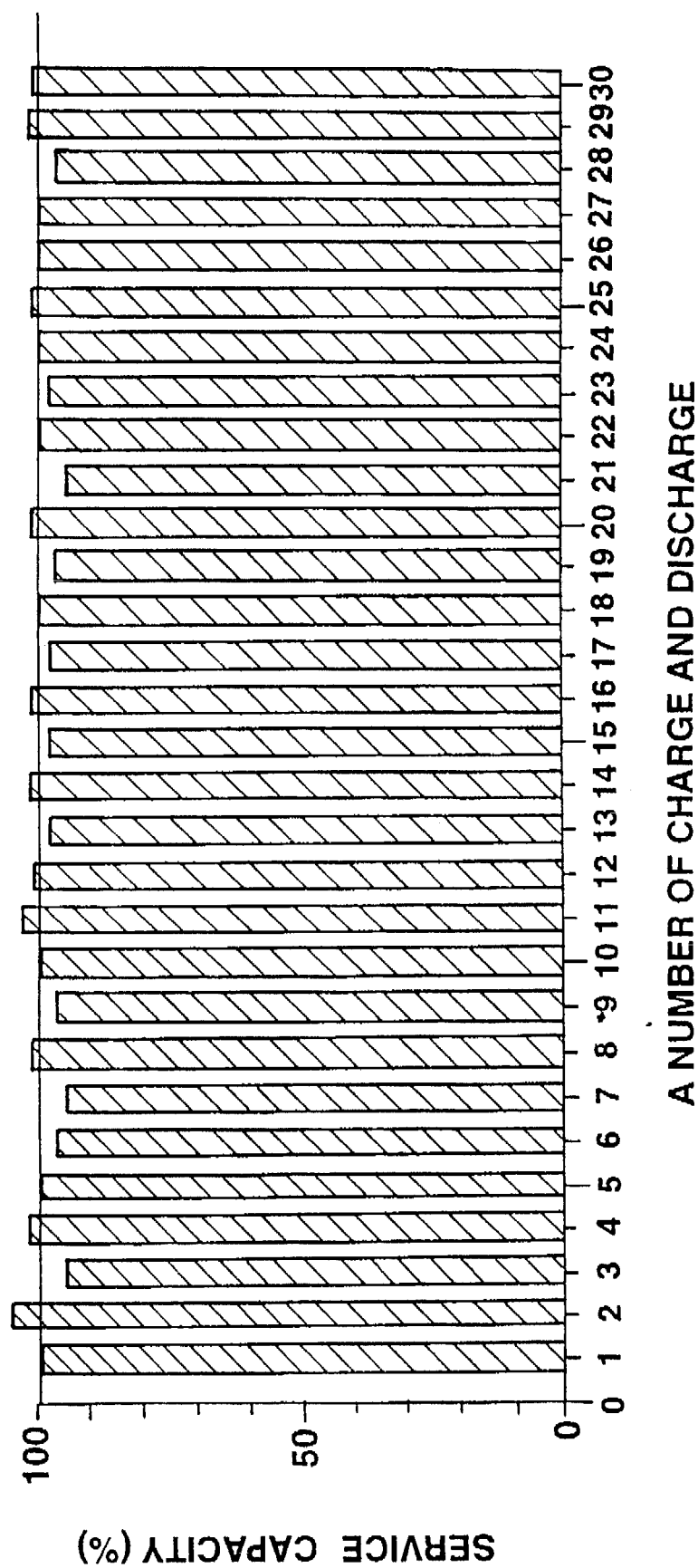
FIG. 4 is a graph illustrating a relationship between a number of cycles of charge and discharge and a service capacity when the secondary battery is charged in accordance with the method of the invention.

The service capacity of the aforementioned secondary battery when it was repeatedly discharged and charged by the aforementioned method of the invention varies at each stage as illustrated in FIG. 4. On the other hand, the service capacity when it was repeatedly discharged and charged by the conventional method varies at each stage as illustrated in FIG. 5.

Figure 5:
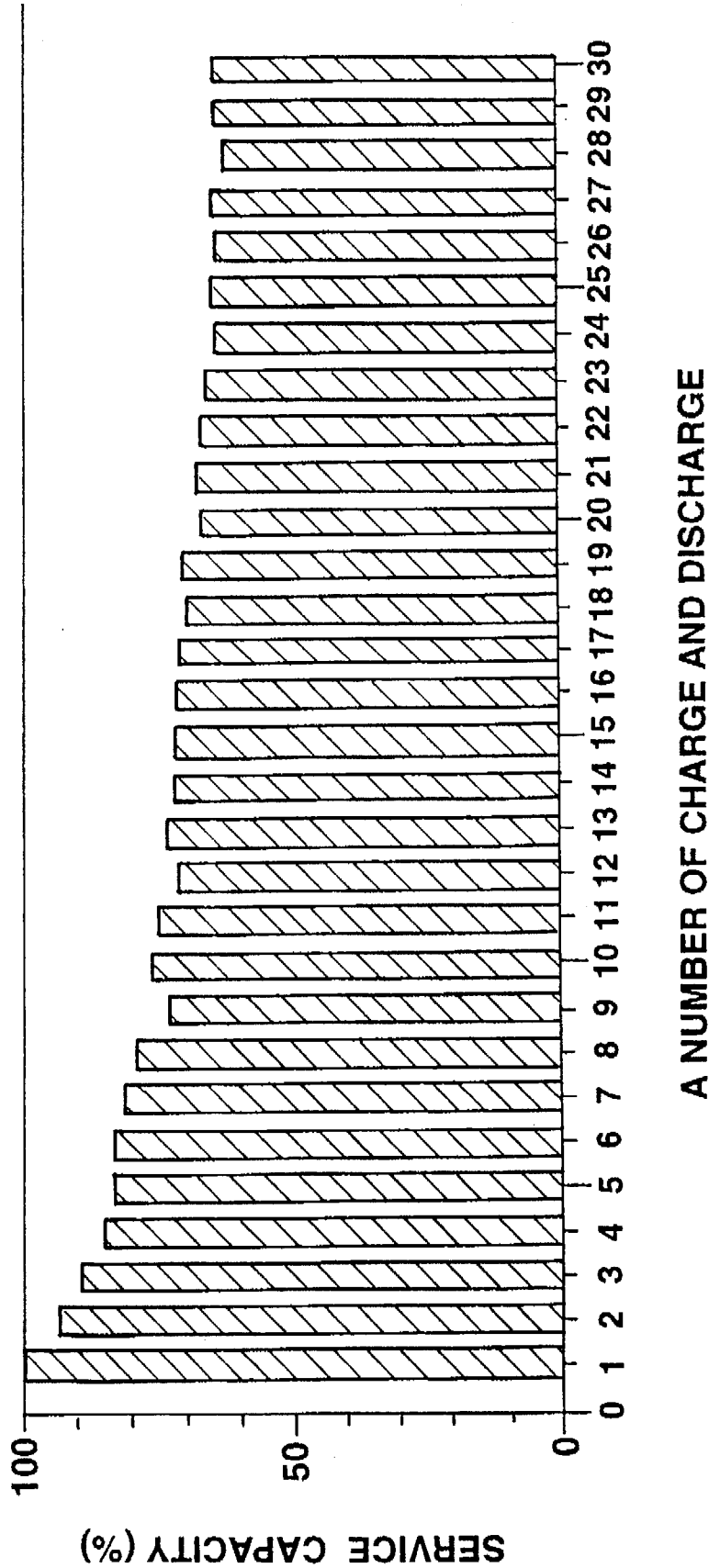
FIG. 5 is a graph illustrating a relationship of a number of cycles of charge and discharge and a discrage capacity when the secondary battery is charged in accordance with the conventional method.

As apparent from FIGS. 4 and 5, in the charging method of the invention, approximately 100% of service capacity is maintained even though 30 cycles of charge and discharge were made, which is caused by no memory effect of the secondary battery happening, while, in the conventional method, the memory effect of the secondary battery happened at a few cycles of charge and discharge and the battery capacity after 30 cycles of charge and discharge decreased to about 64.2%.

An embodiment of the apparatus of the invention will be described with reference to FIG. 6. The same numeral references designate the same components. The power suuply 12 supplies DC 12 V to the power control 14.

The power control 14 may comprise a resistance ladder RA1, transistors Q1 and 93, an amplifier IC1 and so on. The power control 14 serves to convert a digital output from the operation part 18 into an analog output at the resistance ladder RA1, to amplify the analog output at the amplifier IC1 to supply it to the transistor Q1 which makes a base voltage of the power transistor Q3 on and off so that the pulse width and the peak value of the voltage applied across the secondary battery 10 are controlled.

The measurement part 16 may comprise an analog-to-digital converter IC3, a reference voltage generator circuit IC4, voltage divider circuits R9, R10 and R12 and so on. The terminal voltage of the secondary battery 10 is measured by converting the voltage divided by the voltage divider cicruits R9, R11 and R12 into a digital value at the analog-to-digital converter IC3 and supplying it to the operation part 18. The charging current is measured as a terminal voltage across the resistance R13. The measured value of the terminal voltage is input through the analog-to-digital converter IC3 to the operation part 18 where it is converted into a current value.

The operation part 18 may comprise a microcomputer. A program in the microcomputer analyzes the result of measurement from the measurement part 16 and digitally outputs the result of analyzation to the power control 14.

Figure 3:
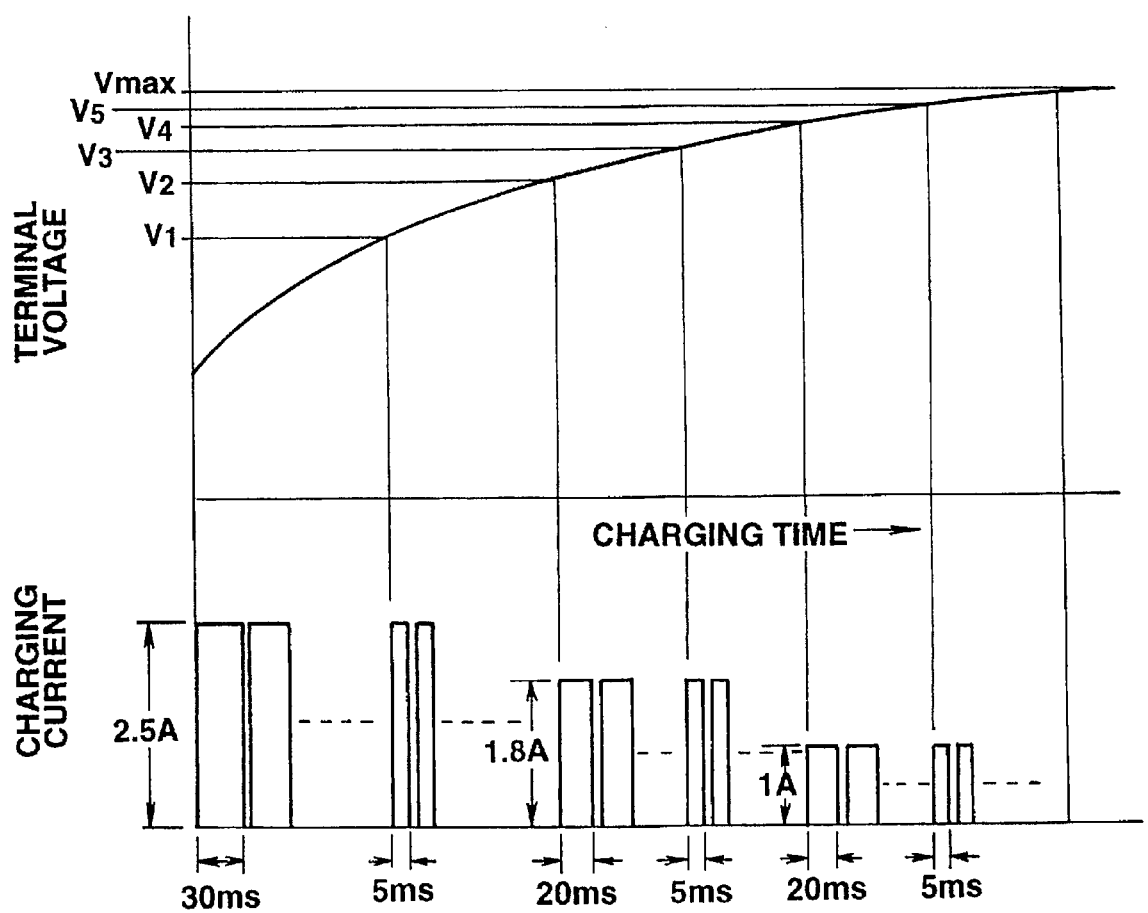
FIG. 3 is a graph illustrating a method of charging a secondary battery in accordance with another mode of the invention.

The operation part 18 operates as follows;

The voltages of $V_1$=6.5 V, $V_2$=7.0 V, $V_3$=7.2 V, $V_4$=7.4 V, $V_5$=7.5 V and $V_{max}$=7.55 V which are indicated in FIG. 3 and the peak values and the pulse width of the charging current corresponding thereto are set at the operation part 18.

With the terminal voltage of the secondary battery 10 lower than the set value $V_1$, the operation part 18 instructs the power control 14 to pass through the secondary battery 10 the charging current having the peak value of 2.5 A and the pulse width 30 ms. With the terminal voltage of the secondary battery equal to or higher than the set value $V_1$ and lower than the set value $V_2$, the operation part 18 instructs the power control 14 to pass the charging current having the peak value of 2.5 A and the pulse width of 5 ms. With the terminal voltage equal to or higher than the set value $V_2$ and lower than the set value $V_3$, the operation part 18 instructs the power control 14 to pass the charging current having the peak value of 1.8 A and the pulse width of 20 ms. With the terminal voltage equal to or higher than the set value $V_3$ and lower than the set value $V_4$, the operation part 18 instructs the power control 14 to pass the charging current having the peak value of 1.8 A and the pulse width of 5 ms. With the terminal voltage equal to or higher than the set value $V_4$ and lower than the maximum value $V_{max}$, the operation part 18 instructs the power control 14 to pass the charging current having the peak value of 1.0 A and the pulse width of 5 ms. Finally, as the terminal voltage reaches the maximum value $V_{max}$, the operation part 18 instructs the power control 14 to finish the charging. In this manner, the method of charging can be carried out.

It should be noted that when the pulse width of the charging current is to be made larger, it should be so set as not to be larger than the maximum value of the preceding pulse widths and when it is to be smaller, it should be so set as to have the same value as the minimum value of the preceding pulse widths.

Although some preferred embodiments of the invention have been described and illustrated with reference to the accompanying drawings, it will be understood by those skilled in the art that they are by way of examples and that various changes and modifications will be made without departing from the spirit and scope of the invention, which is intended to be defined to the appended claims.

What is claimed is:

1. A method of charging a secondary battery characterized by comprising the steps of;

intermittently passing a charging current through said secondary battery by applying voltage pulses higher than a rated terminal voltage of said secondary battery at predetermined intervals;

measuring a terminal voltage of said secondary battery while said voltage pulses are not applied and measuring said charging current while said voltage pulses are applied;

steppedly setting a plurality of terminal voltages different from each other within a range of variation in said rated terminal voltage from a course of charging to an end of charging;

controlling said charging current pulses so that at least one of a peak value and a pulse width of said charging current varies everytime the measured terminal voltage of said secondary battery reaches the set terminal voltage at each stage whereby said secondary battery is charged until said terminal voltage reaches the set terminal voltage at the final stage.

2. A method of charging a secondary battery as set forth in claim 1, and wherein said charging current pulses are so controlled that they have the same peak value kept and the pulse width smaller than ever as the measured terminal voltage of said secondary battery reaches said set terminal voltage at each stage, then they have the peak value smaller than ever and the pulse width larger than ever, and repeat the control of the aforementioned two steps.

3. A method of charging a secondary battery as set forth in claim 2, and wherein said pulse width is made larger so that it never exceeds the maximum value of the preceding pulse widths and smaller so that it is identical to the minimum value of the preceding pulse widths.

4. An apparatus for charging, a secondary battery characterized by comprising the steps of;

a DC power supply;

a power control to control at least one of a peak value and a pulse width of charging current pulses being supplied from said DC power supply to said secondary battery;

a measurement part to measure a charging current and a terminal voltage of said secondary battery;

and an operation part to provide an instruction on said peak value and said pulse width of said charging current pulses to said power control based on a measurement result from said measurement part;

said operation part having a plurality of set voltages different from each other within a range of variation in said terminal voltage from a course of charging to an end of charging and receiving a terminal voltage of said secondary battery while a voltage is not applied and said charging current while said voltage is applied to provide said instruction on varying at least one of said peak value and said pulse width of said charging current pulses everytime the input terminal voltage of said secondary battery reaches the set terminal voltage at each stage, and said power control controlling said charging current based on said instruction from said operation part.

* * * * *

UNITED STATES PATENT AND TRADEMARK OFFICE
CERTIFICATE OF CORRECTION

PATENT NO. : 5,646,506
DATED : July 8, 1997
INVENTOR(S) : Takeshi Suzuki

It is certified that error appears in the above-indentified patent and that said Letters Patent is hereby corrected as shown below:

Column 1, line 60, change "Lo" to --to--.

Column 2, lines 9-11, should not be indented beyond the word "intermittently".

Column 2, lines 13-15, should not be indented beyond the word "measuring".

Column 2, line 55, change "set, voltages" to --set voltages--.

Column 3, line 7, change "bIock" to --block--.

Column 3, line 49, change "10," to --10.--.

Column 4, line 15, change "battery" to --battery 10.--.

Column 5, line 36, change "Q1 and 93," to --Q1 and Q3,--.

Column 7, line 4, change "charging," to --charging--.

Signed and Sealed this

Fourteenth Day of October, 1997

Attest:

BRUCE LEHMAN

Attesting Officer

Commissioner of Patents and Trademarks